US010670799B2

(12) United States Patent
Lee et al.

(10) Patent No.: US 10,670,799 B2
(45) Date of Patent: Jun. 2, 2020

(54) BACKLIGHT UNIT AND DISPLAY DEVICE INCLUDING THE SAME

(71) Applicant: SAMSUNG DISPLAY CO. LTD., Yongin-si, Gyeonngi-Do (KR)

(72) Inventors: Won Chul Lee, Seoul (KR); Dong Jin Park, Gwangmyeong-si (KR); Taek Sun Shin, Yongin-si (KR); Jin Gyu Sim, Suwon-si (KR); Jung Gil Oh, Hwaseong-si (KR); Kwang Sun You, Cheonan-si (KR); Byoung Jin Jin, Yongin-si (KR); Jong Hyeon Choi, Pyeongtaek-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/165,454

(22) Filed: Oct. 19, 2018

(65) Prior Publication Data

US 2019/0179077 A1 Jun. 13, 2019

(30) Foreign Application Priority Data

Dec. 7, 2017 (KR) .......................... 10-2017-0167568

(51) Int. Cl.
*F21V 8/00* (2006.01)
(52) U.S. Cl.
CPC .......... *G02B 6/0088* (2013.01); *G02B 6/0093* (2013.01)
(58) Field of Classification Search
CPC ................. G02B 6/0088; G02F 1/1335; G02F 1/133615; G02F 1/133608; G02F 2001/133314; G02F 2001/133328
See application file for complete search history.

(56) References Cited

U.S. PATENT DOCUMENTS

| 7,142,264 | B2* | 11/2006 | Choi | G02F 1/133308 349/58 |
| 8,439,550 | B2* | 5/2013 | Sohn | F21V 15/01 349/58 |
| 9,304,345 | B2* | 4/2016 | Kim | G02F 1/133308 |
| 9,335,576 | B2* | 5/2016 | Shin | G02F 1/133308 |

(Continued)

FOREIGN PATENT DOCUMENTS

| KR | 10-1152844 | 6/2012 |
| KR | 10-1246237 | 3/2013 |
| KR | 10-1361003 | 2/2014 |

(Continued)

OTHER PUBLICATIONS

KR 20160035159, Mar. 31, 2016, RYU, English Translation (Year: 2016).*

Primary Examiner — Peggy A Neils
(74) Attorney, Agent, or Firm — F. Chau & Associates, LLC

(57) ABSTRACT

A backlight unit includes a light guide plate (LGP), a housing that receives the LGP, and a first LGP guide member coupled to the housing. The housing includes a bottom surface, a first sidewall, and a second sidewall. The first and second sidewalls are connected to edges of the bottom surface, are disposed adjacent to each other, and are spaced apart from each other. A first corner of the bottom surface is disposed between the first and second sidewalls, and the first LGP guide member is disposed in a gap between the first and second sidewalls.

18 Claims, 12 Drawing Sheets

(56) References Cited

U.S. PATENT DOCUMENTS 9,389,460 B2 * 7/2016 Park .................. G02F 1/133605
2014/0043858 A1 * 2/2014 Jang .................... G02B 6/0088
                                                              362/613

FOREIGN PATENT DOCUMENTS

KR      1020160035159      3/2016
KR      1020170066961      6/2017

* cited by examiner

BACKLIGHT UNIT AND DISPLAY DEVICE INCLUDING THE SAME

CROSS-REFERENCE TO RELATED APPLICATIONS

This application claims priority under 35 U.S.C. § 119 to Korean Patent Application No. 10-2017-0167568, filed on Dec. 7, 2017, the disclosure of which is incorporated by reference herein in its entirety.

TECHNICAL FIELD

Exemplary embodiments of the present inventive concept relate to a backlight unit, and a display device including the same.

DISCUSSION OF THE RELATED ART

A liquid crystal display (LCD) device includes a liquid crystal layer disposed between two glass substrates, and displays information by applying voltages to electrodes disposed on or below the glass substrates.

LCD devices are light-receiving devices that cannot emit light themselves, but rather, display images by controlling the transmittance of light incident thereon. LCD devices utilize a backlight unit to apply light to a display panel.

A backlight unit may be classified as a direct-type backlight unit or an edge-type backlight unit depending on the arrangement of light sources disposed thereon. An edge-type backlight unit has a structure in which light sources are disposed on one side of a light guide plate, and a direct-type backlight unit has a structure in which light sources are disposed below a display panel. The use of edge-type backlight units has been increasing as display devices become thinner and more lightweight.

SUMMARY

Exemplary embodiments of the present inventive concept provide an edge-type backlight unit having a structure in which a light guide plate is stably fixed, and a display device including the backlight unit.

According to an exemplary embodiment of the present inventive concept, a backlight unit includes a light guide plate (LGP), a housing that receives the LGP, and a first LGP guide member coupled to the housing. The housing includes a bottom surface, a first sidewall, and a second sidewall. The first and second sidewalls are connected to edges of the bottom surface, are disposed adjacent to each other, and are spaced apart from each other. A first corner of the bottom surface is disposed between the first and second sidewalls, and the first LGP guide member is disposed in a gap between the first and second sidewalls.

According to an exemplary embodiment of the present inventive concept, a display device includes a backlight unit and a display panel disposed on the backlight unit. The backlight unit includes a light guide plate (LGP), a housing that receives the LGP, and a first LGP guide member coupled to the housing. The housing includes a bottom surface, a first sidewall, and a second sidewall. The first and second sidewalls are connected to edges of the bottom surface, the first and second sidewalls are disposed adjacent to each other and are spaced apart from each other, and a first corner of the bottom surface is disposed between the first and second sidewalls. The first LGP guide member is disposed in a gap between the first and second sidewalls.

According to the aforementioned and other exemplary embodiments of the present inventive concept, a light guide plate is stably supported, and as a result, a backlight unit and a display device with improved durability is provided.

In addition, since light guide plate supporting members are disposed at the corners of a housing, a backlight unit and a display device having a narrow bezel are provided.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
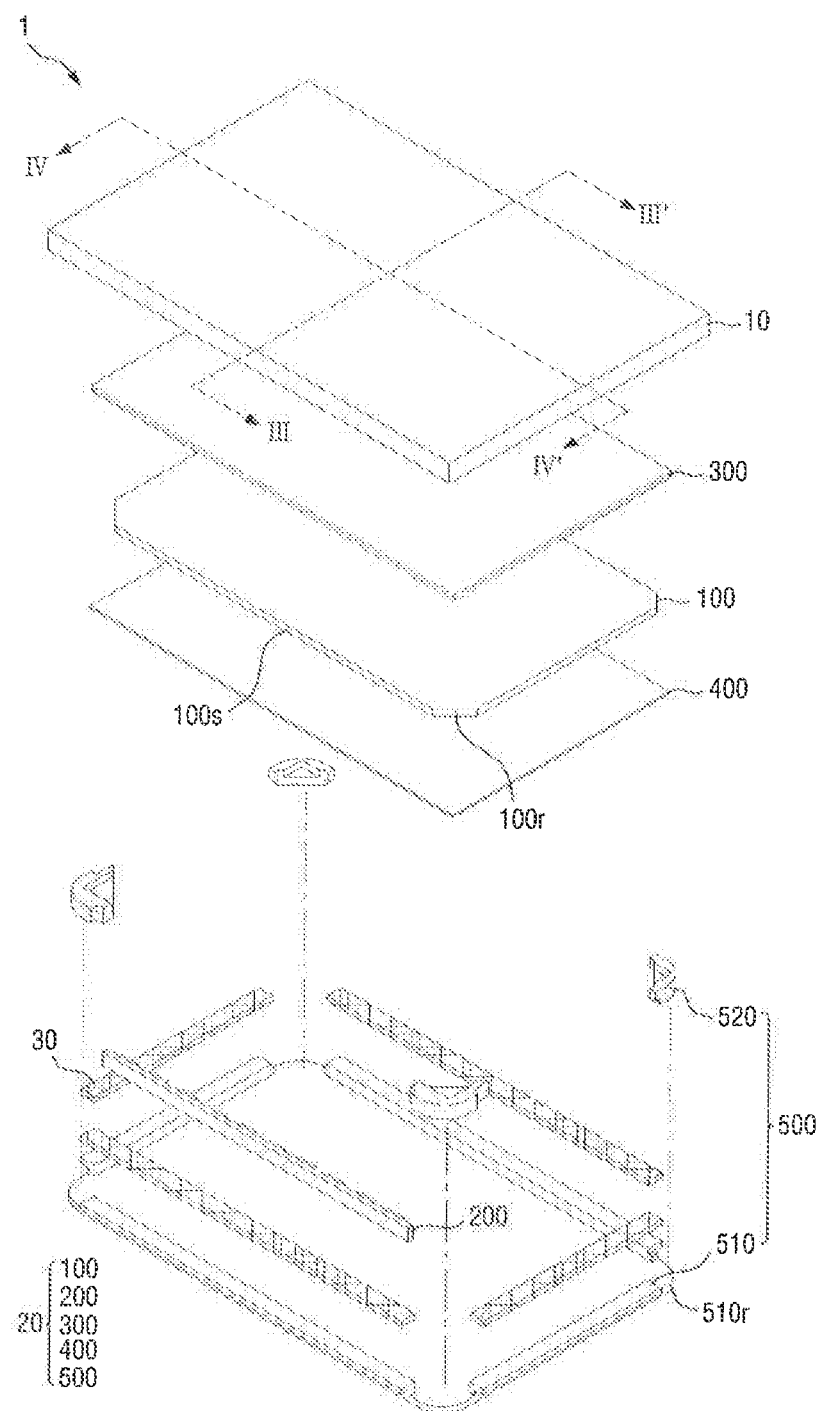
FIG. 1 is an exploded perspective view of a display device according to an exemplary embodiment of the present inventive concept.

Exemplary embodiments of the present inventive concept will be described more fully hereinafter with reference to the accompanying drawings. Like reference numerals may refer to like elements throughout the accompanying drawings.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Herein, when two or more elements or values are described as being substantially the same as or about equal to each other, it is to be understood that the elements or values are identical to each other, indistinguishable from each other, or distinguishable from each other but functionally the same as each other as would be understood by a person having ordinary skill in the art. It will be further understood that when two components or directions are described as extending substantially parallel or perpendicular to each other, the two components or directions extend exactly parallel or perpendicular to each other, or extend approximately parallel or perpendicular to each other within a measurement error as would be understood by a person having ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art.

FIG. 1 is an exploded perspective view of a display device according to an exemplary embodiment of the present inventive concept.

Referring to FIG. 1, in an exemplary embodiment, a display device 1 includes a display panel 10 and a backlight unit 20. The backlight unit 20 provides light to the display panel 10. The backlight unit 20 may include a light guide plate (LGP) 100, a light source unit 200, one or more optical sheets 300, a reflective sheet 400, and a housing 500. The housing 500 accommodates the light guide plate 100, the light source unit 200, the optical sheets 300, and the reflective sheet 400. Unless specified otherwise, the terms "upper", "top", and "above" refer to a display surface's side, and the terms "lower", "bottom", and "below" refer to the opposite side of the display surface.

The display panel 10 displays an image. For example, the display panel 10 may be a liquid crystal display (LCD) panel. The display device 1 will hereinafter be described as being a flat display device having an LCD panel as the display panel 10 as an example. However, exemplary embodiments of the present inventive concept are not limited thereto. For example, various types of display panels other than an LCD panel, such as an electro-wetting display panel, an electrophoretic display panel, and a micro-electromechanical system (MEMS) display panel, may also be applicable to the display device 1 according to exemplary embodiments of the inventive concept.

The backlight unit 20 is disposed below the display panel 10. The backlight unit 20 provides light to the display panel 10. The display panel 10 displays an image by receiving is light from the backlight unit 20.

Figure 3:
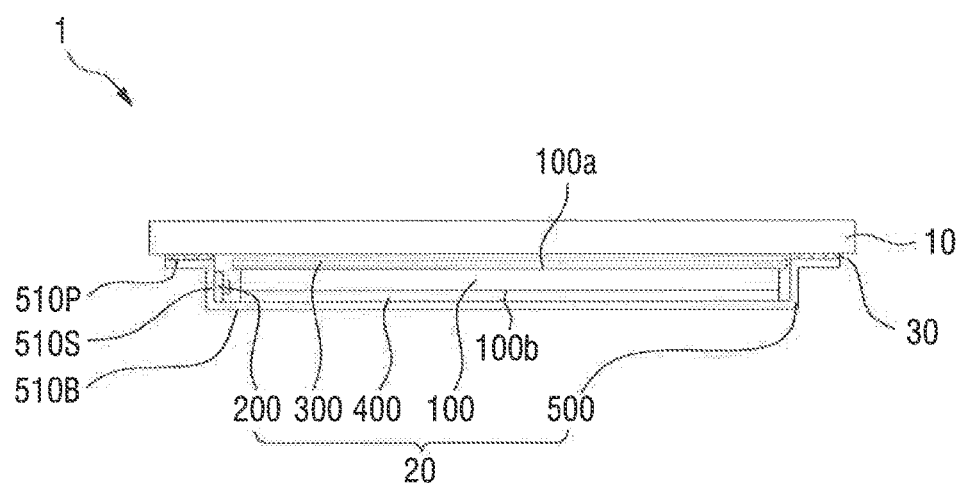
FIG. 3 is a cross-sectional view taken along line III-III' of FIG. 1 according to an exemplary embodiment of the present inventive concept.
Figure 4:
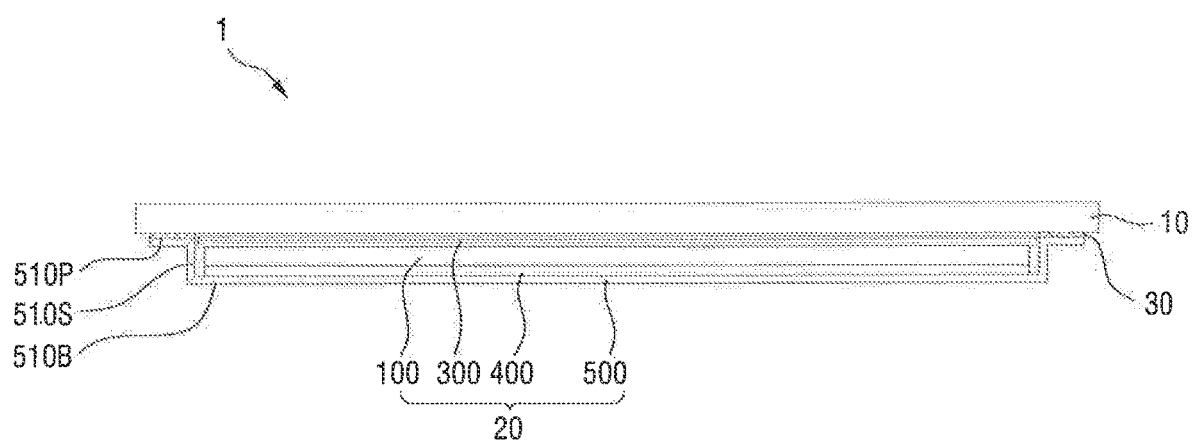
FIG. 4 is a cross-sectional view taken along line IV-IV' of FIG. 1 according to an exemplary embodiment of the present inventive concept.

The backlight unit 20 will hereinafter be described with reference to FIGS. 2 through 4.

Figure 2:
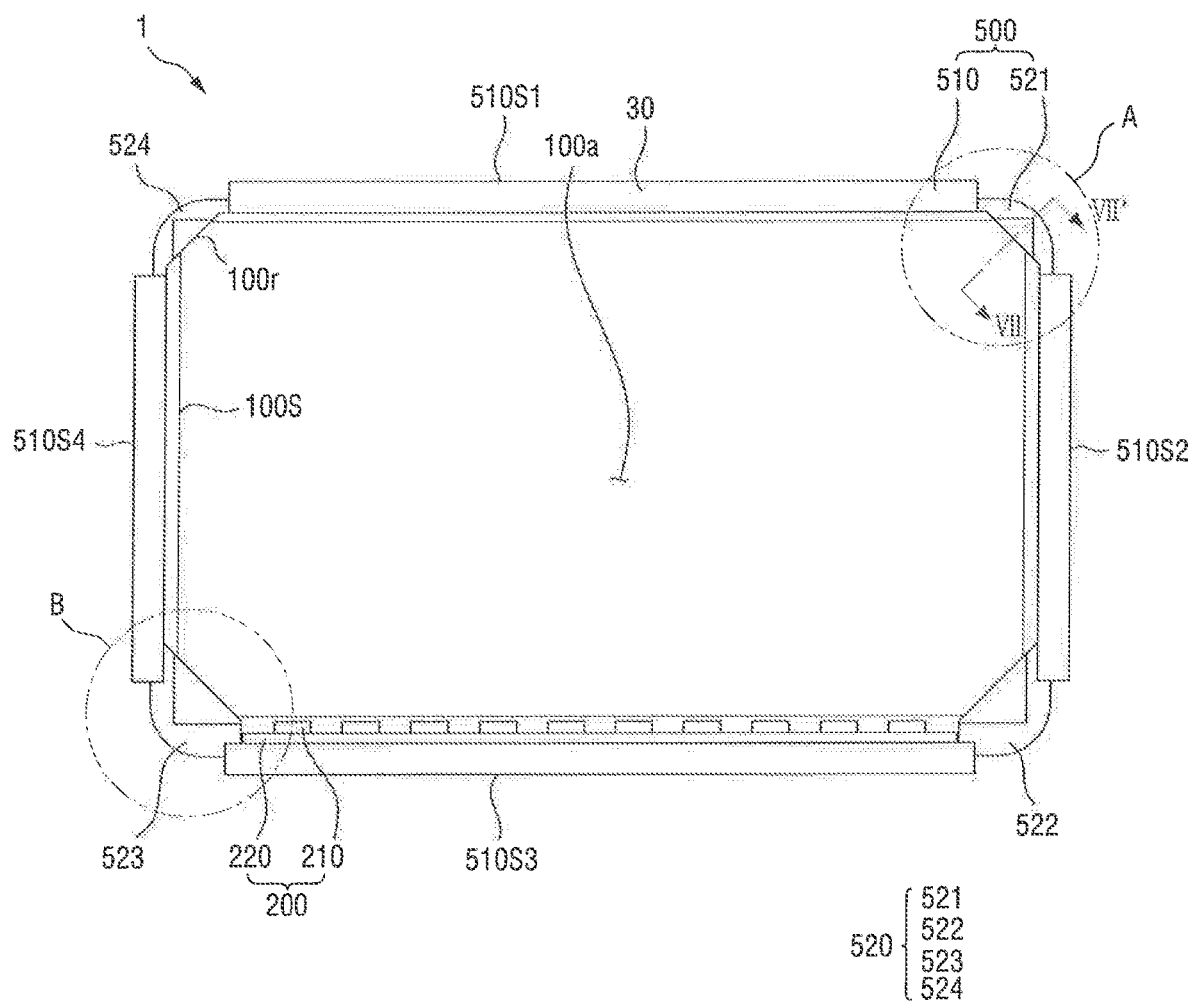
FIG. 2 is a plan view of a backlight unit according to an exemplary embodiment of the present inventive concept.

FIG. 2 is a plan view of a backlight unit according to an exemplary embodiment of the present inventive concept. For convenience of illustration, the optical sheets 300 of FIG. 1 are not illustrated in FIG. 2. FIG. 3 is a cross-sectional view taken along line III-III' of FIG. 1 according to an exemplary embodiment of the present inventive concept. FIG. 4 is a cross-sectional view taken along line IV-IV' of FIG. 1 according to an exemplary embodiment of the present inventive concept.

Referring to FIGS. 1 through 4, in an exemplary embodiment, the housing 500 includes a body portion 510 and light guide plate guide members 520, which are coupled to corners 510r of the body portion 510. The body portion 510 includes a bottom surface 510B, a plurality of sidewalls 510S, which are connected to the edges of the bottom surface 510B, and protruding portions 510P, which protrude outwardly from the sidewalls 510S. In an exemplary embodiment, the body portion 510 includes first and third sidewalls 510S1 and 510S3 and second and fourth sidewalls 510S2 and 510S4, which intersect the first and third sidewalls 510S1 and 510S3 and are opposite to the first and third sidewalls 510S1 and 510S3, respectively. In an exemplary embodiment, the sidewalls 510S may be bent, and may extend from the bottom surface 510B. In this exemplary embodiment, the sidewalls 510S and the bottom surface 510B may be integrally formed without any connecting portions disposed therebetween.

In an exemplary embodiment, the first through fourth sidewalls 510S1 through 510S4 of the body portion 510 are not connected to one another and are spaced apart from one another. For example, the first through fourth sidewalls 510S1 through 510S4, which are adjacent to one another with the corners 510r of the body portion 510 disposed therebetween, may be spaced apart from one another. For example, in an exemplary embodiment, the first sidewall 510S1 is connected to the corresponding edge of the bottom surface 510B, but is not disposed at the corners 510r, so that the edges of the bottom surface 510B are exposed at the corners 510r. Also, in an exemplary embodiment, the second, third, and fourth sidewalls 510S2, 510S3, and 510S4 are connected to the corresponding edges of the bottom surface 510B, but are not disposed at the corners 510r. The corners 510r where the sidewalls 510S are not disposed provide spaces in which to arrange the light guide plate guide members 520. The light guide plate guide members 520 will be described in further detail below.

In an exemplary embodiment, the body portion 510 includes the protruding portions 510P, which protrude outwardly from the sidewalls 510S. However, exemplary embodiments of the present inventive concept are not limited thereto. For example, in exemplary embodiments, the protruding portions 510r may be disposed only at the first and third sidewalls 510S1 and 510S3 or at the second and fourth sidewalls 510S2 and 510S4. In an exemplary embodiment, housing coupling members 30 are disposed on the protruding portions 510P and fix the display panel 10. For example, the display device 1 may further include the housing coupling members 30, which are disposed between the housing 500 and the display panel 10, and which fix the display panel 10 to the housing 500.

The housing coupling members 30 may include a polymer resin or an adhesive tape. In exemplary embodiments, the housing coupling members 30 may include a light-absorbing material, such as a black pigment or dye, or a reflective material, and may thus perform a light-blocking function that prevents light from leaking to unintended places. Thus, in addition to fixing the display panel 10 to the housing 500, in exemplary embodiments, the housing coupling members also improve the optical efficiency of the display device 1 by preventing light from leaking to a region other than a display region.

The protruding portions 510P may have a planar shape and may protrude outwardly from the sidewalls 510S. The ends of the protruding portions 510P may be disposed on the inner sides of the sides of the display panel 10. For example, in a plan view, the protruding portions 510P may be hidden from view by the display panel 10. In this case, the bezel area of the display device 1 is reduced, and as a result, a narrow bezel is realized.

However, the shape of the protruding portions 510P is not particularly limited. For example, each of the protruding portions 510P may have a first plane that extends outwardly from one of the sidewalls 510S, and a second plane that is bent and extends from the first plane toward the bottom surface 510B. The second plane may have substantially the same height as the sidewalls 510S. In this case, the first plane is supported by the second plane. Also, since the load of the display panel 10 is distributed, the display panel 10 is stably fixed.

In an exemplary embodiment, the sidewalls 510S of the body portion 510 are thick enough to support the display panel 10. In this case, the protruding portions 510P may not be provided, and the housing coupling members 30, instead of the protruding portions 510P, may be disposed on the top surfaces of the sidewalls 510S of the body portion 510.

In exemplary embodiments, the light guide plate 100 is accommodated in an inner space defined by the body portion 510 of the housing 500 and the light guide plate guide members 520.

The light guide plate 100 guides the path of light. The light guide plate 100 may be substantially in the shape of a polygonal column. The light guide plate 100 may have a rectangular shape in a plan view. However, exemplary embodiments of the present inventive concept are not limited thereto. In an exemplary embodiment, the light guide plate 100 may be in the shape of a hexagonal column whose planar shape is rectangular, and may have a top surface 100a, a bottom surface 100b, and four side surfaces 100s.

In exemplary embodiments, the light guide plate 100 further includes corner inclined surfaces 100r, which are disposed between the four side surfaces 100s. The corner inclined surfaces 100r may also be referred to herein as notches of the light guide plate 100. A pair of adjacent side surfaces 100s of the light guide plate 100 meet both edges of one corner inclined surface 100r. The corner inclined surfaces 100r are inclined with respect to the side surfaces 100s of the light guide plate 100. The angle that the corner inclined surfaces 100r form with the side surfaces 100s may be an obtuse angle. For example, the corner inclined surfaces 100r may form an angle of about 135° with the side surfaces 100s.

The corner inclined surfaces 100r reduce the sharpness of the edges of the light guide plate 100, and may thus prevent the light guide plate 100 from being damaged by external impact. The corner inclined surfaces 100r may be flat, or may be partially curved.

The corner inclined surfaces 100r of the light guide plate 100 may be fixed by the light guide plate guide members 520 of the housing 500. The corner inclined surfaces 100r of the light guide plate 100 are illustrated as being placed in contact with the light guide plate guide members 520. However, exemplary embodiments the present inventive concept are not limited thereto. For example, in exemplary embodiments, the corner inclined surfaces 100r of the light guide plate 100 may be a predetermined distance apart from the light guide plate guide members 520. The side surfaces 100s of the light guide plate 100 may be a predetermined distance apart from the sidewalls 510S of the housing 500. The light guide plate 100 may expand in a high-temperature environment. Thus, if there is no space for the expansion of the light guide plate 100, the light guide plate 100 may warp or crack. Alternatively, if the light guide plate 100 is a predetermined distance apart from the housing 500 so that a sufficient space is secured between the light guide plate 100 and the housing 500, as is the case according to exemplary embodiments of the present inventive concept, the light guide plate 100 may not be damaged even if it expands.

The light guide plate 100 may include an inorganic material. For example, the light guide plate 100 may be formed of glass. However, exemplary embodiments of the present inventive concept are not limited thereto.

The light source unit 200 may be disposed adjacent to at least one side surface 100s of the light guide plate 100. For example, as illustrated in FIGS. 1 through 3, in an exemplary embodiment, a plurality of light-emitting diodes (LEDs) 210 mounted on a printed circuit board (PCB) 220 are disposed on a side surface 100s corresponding to one long side of the light guide plate 100. However, exemplary embodiments of the present inventive concept are not limited thereto. For example, in exemplary embodiments, the LEDs 210 are disposed adjacent to a pair of opposite side surfaces 100s corresponding to both long sides of the light guide plate 100, a side surface 100s corresponding to one short side of the light guide plate 100, or a pair of opposite side surfaces 100s corresponding to both short sides of the light guide plate 100.

The light source unit 200 may be fixed to one sidewall 510S of the body portion 510 of the housing 500. For example, the light source unit 200 may be fixed to the third sidewall 510S3 of the housing 500.

In an exemplary embodiment, the LEDs 210 may be top-emitting LEDs emitting light through the top surfaces thereof, as illustrated in FIG. 1. In this exemplary embodiment, the PCB 220 may be disposed on the third sidewall 510S3 of the housing 500. However, exemplary embodiments of the present inventive concept are not limited thereto. For example, in an exemplary embodiment, the LEDs 210 may be side-emitting LEDs emitting light through the sides thereof. In this exemplary embodiment, the PCB 220 may be disposed on the bottom surface 510B of the housing 500.

The light source unit 200 may be a predetermined distance from the light guide plate 100. By providing a space between the light source unit 200 and the light guide plate 100, the light guide plate 100 is prevented from being damaged by heat generated by the light source unit 200.

One or more optical sheets 300 may be further provided on the top surface 100a of the light guide plate 100. The optical sheets 300 may be disposed between the display panel 10 and the light guide plate 100. The optical sheets 300 may be mounted on the light guide plate guide members 520, as described in further detail below.

The optical sheets 300 may include, for example, a prism sheet, a diffusion sheet, a is micro-lens sheet, a lenticular sheet, a polarizing sheet, a reflective polarizing sheet, or a phase different sheet. The display device 1 may include a plurality of optical sheets 300 that are of the same type or of different types. In a case in which the plurality of optical sheets 300 are used, the plurality of optical sheets 300 may be disposed to overlap with one another, and the corners of each of the plurality of optical sheets 300 may be mounted on the light guide plate guide members 520.

The reflective sheet 400 may be disposed below the light guide plate 100. The reflective sheet 400 may be disposed between the bottom surface 100b of the light guide plate 100 and the bottom surface 510B of the housing 500.

The reflective sheet 400 may include a reflective film or a reflective coating layer. The optical sheet 400 reflects light emitted from the bottom surface 100b of the light guide plate 100 back into the light guide plate 100.

The light guide plate guide members 520 will hereinafter be described with reference to FIGS. 2 and 5 through 7.

Figure 5:
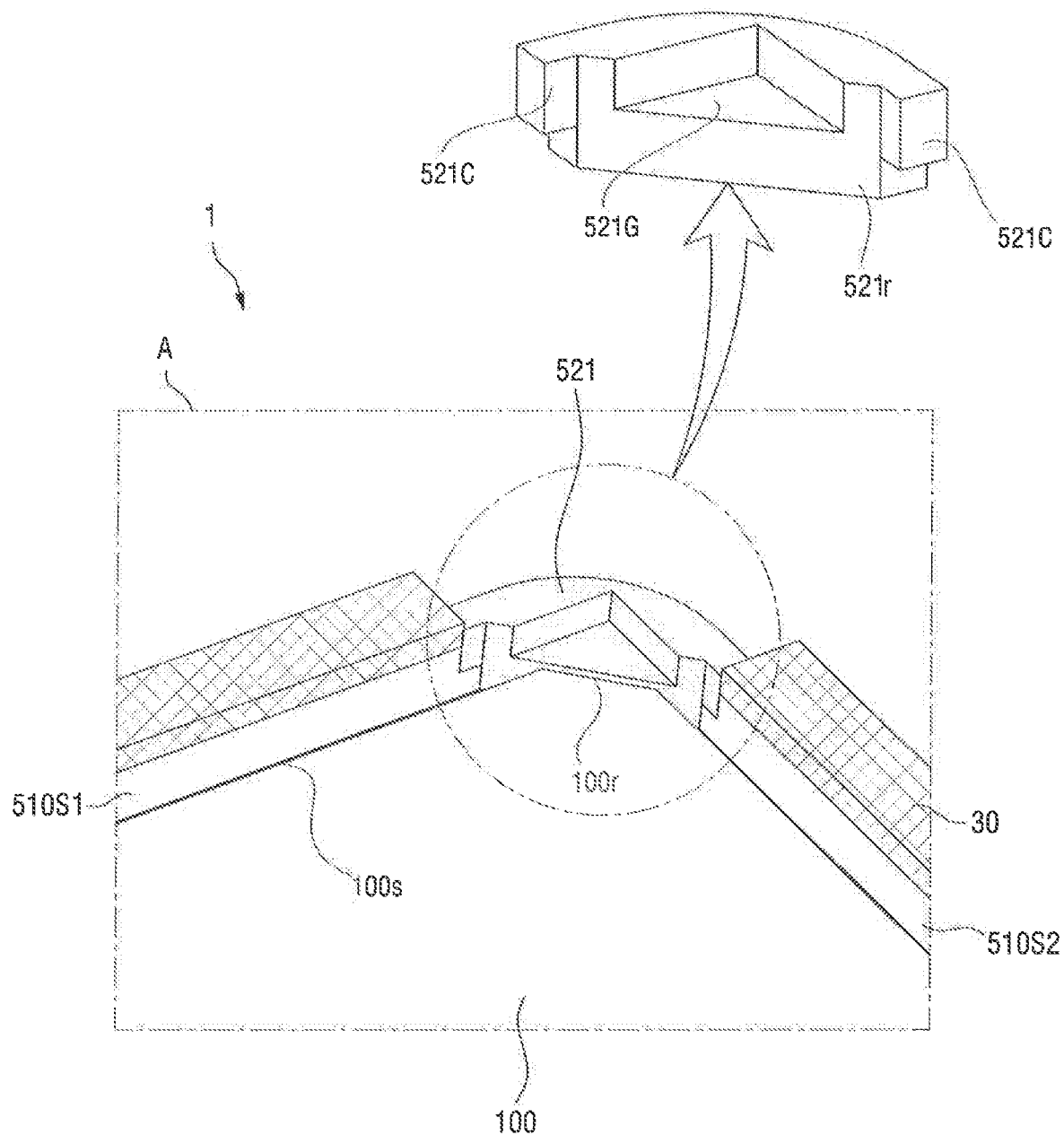
FIG. 5 is an enlarged perspective view of area A of FIG. 2 according to an exemplary embodiment of the present inventive concept.
Figure 6:
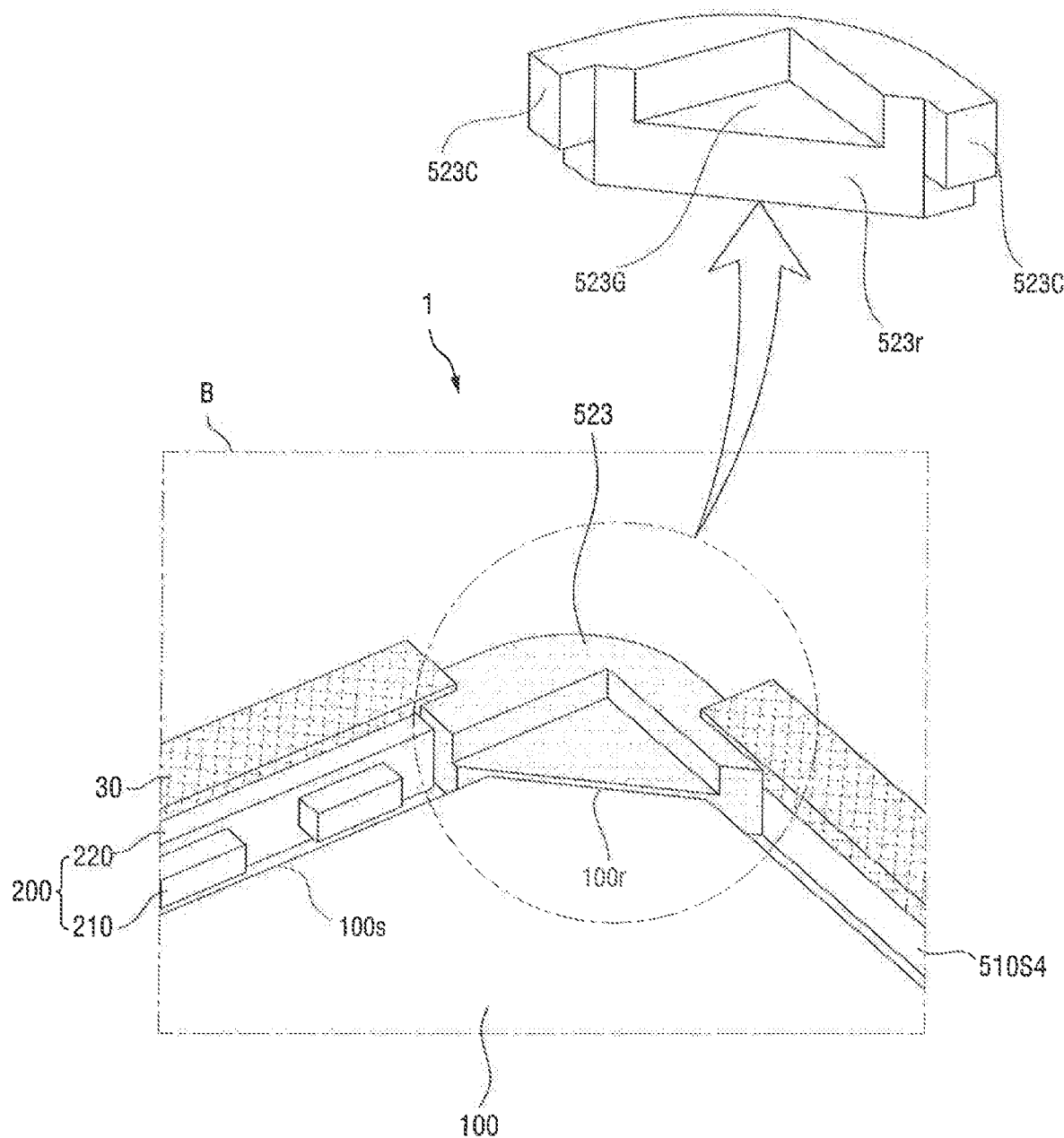
FIG. 6 is an enlarged perspective view of area B of FIG. 2 according to an exemplary embodiment of the present inventive concept.
Figure 7:
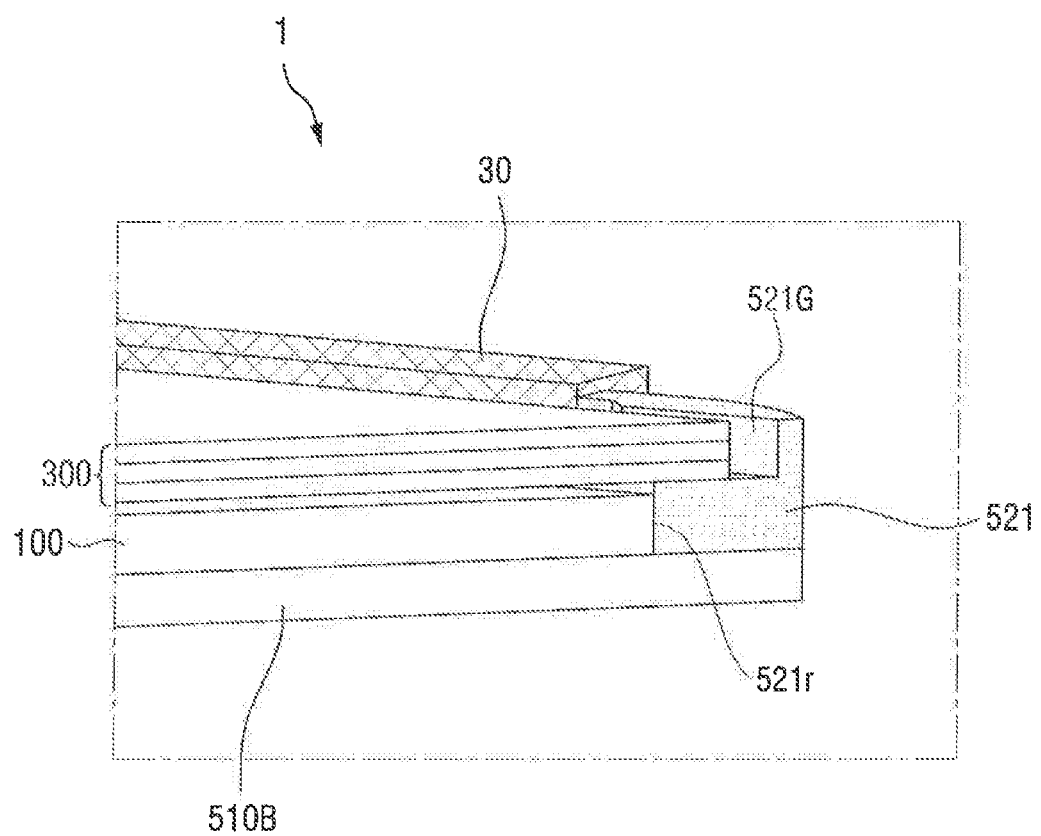
FIG. 7 is a cross-sectional view taken along line VII-VII' of FIG. 2 according to an exemplary embodiment of the present inventive concept.

FIG. 5 is an enlarged perspective view of area A of FIG. 2 according to an exemplary embodiment of the present inventive concept. FIG. 6 is an enlarged perspective view of area B of FIG. 2 according to an exemplary embodiment of the present inventive concept. FIG. 7 is a cross-sectional view taken along line VII-VII' of FIG. 2 according to an exemplary embodiment of the present inventive concept.

Referring to FIGS. 2 and 5 through 7, in an exemplary embodiment, the light guide plate guide members 520 are coupled to the corners 510r of the body portion 510.

In an exemplary embodiment, the light guide plate guide members 520 are formed at the body portion 510 through outsert molding using a mold material. In this exemplary embodiment, the light guide plate guide members 520 may be coupled to the body portion 510 without the aid of an additional adhesive member. The light guide plate guide members 520 may include, for example, polycarbonate (PC) and glass fiber that are mixed at a predetermined ratio.

In an exemplary embodiment, the light guide plate guide members 520 include first through fourth light guide plate guide members 521 through 524. The first light guide plate guide member 521 is disposed at the corner 510r between the first and second sidewalls 510S1 and 510S2. The second light guide plate guide member 522 is disposed at the corner 510r between the second and third sidewalls 510S2 and 510S3. The third light guide plate guide member 523 is disposed at the corner 510r between the third and fourth sidewalls 510S3 and 510S4. The fourth light guide plate guide member 524 is disposed at the corner 510r between the fourth and first sidewalls 510S4 and 510S1.

The first through fourth light guide plate guide members 521 through 524 have similar shapes and functions, but the second and third light guide plate guide members 522 and 523 differ from the first and fourth light guide plate guide members 521 and 524 in that they are disposed adjacent to the third sidewall 510S3. Thus, the shape of the first light guide plate guide member 521 may be symmetrical with the shape of the fourth light guide plate guide member 524, and the shape of the second light guide plate guide member 522 may be symmetrical with the shape of the third light guide plate guide member 523.

The light guide plate guide members 520 will hereinafter be described using the first light guide plate guide member 521 as an example, and for convenience of explanation, descriptions of features that the light guide plate guide members 520 all share in common will be omitted or simplified.

In an exemplary embodiment, the first light guide plate guide member 521 includes coupling portions 521C, which are fixed to the body portion 510 of the housing 500, and a guide inclined surface 521r, which prevents the movement of the light guide plate 100.

For example, in an exemplary embodiment, the first light guide plate guide member 521 includes the coupling portions 521C, which are coupled to the ends of the first and second sidewalls 510S1 and 510S2. The shape of the coupling portions 521C may correspond to the shape of the ends of the first and second sidewalls 510S1 and 510S2. For example, the coupling portions 521C may be formed to have stepped portions that fit stepped portions formed at the ends of the first and second sidewalls 510S1 and 510S2.

In an exemplary embodiment, the inner sides of the coupling portions 521C are substantially aligned with the inner sides of the first and second sidewalls 510S1 and 510S2. Thus, the first light guide plate guide member 521 does not protrude inwardly beyond the first and second sidewalls 510S1 and 510S2, and as a result, an unnecessary waste of space is prevented. For example, if the first light guide plate guide member 521 protrudes inwardly beyond the first and second sidewalls 510S1 and 510S2 or is disposed on the inside of the first and second sidewalls 510S1 and 510S2, a space for the light guide plate 100 may be reduced, and as a result, the bezel area of the display device 1 may be increased. Alternatively, if the first light guide plate guide member 521 is disposed in the gap between the first and second sidewalls 510S1 and 510S2 and does not protrude inwardly beyond the first and second sidewalls 510S1 and 510S2, as is the case according to exemplary embodiments of the present inventive concept, a large space (e.g., as large a space as possible) may be secured for the light guide plate 100, and as a result, the bezel area of the display device 1 may be reduced.

In an exemplary embodiment, the first light guide plate guide member 521 includes the guide inclined surface 521r, which corresponds to one of the corner inclined surfaces 100r of the light guide plate 100. As described above, the guide inclined surface 521r may be disposed adjacent to the corresponding corner inclined surface 100r.

In an exemplary embodiment, the guide inclined surface 521r is disposed at an inclination with respect to the coupling portions 521C. The inclination angle of the guide inclined surface 521r corresponds to the inclination angle of the corner inclined surfaces 100r of the light guide plate 100. For example, in an exemplary embodiment in which the inclination angle of each of the corner inclined surfaces 100r with respect to the side surfaces 100s is about 135°, the inclination angle of the guide inclined surface 521r with respect to the inner sides of the coupling portions 521C may be about 45°. For example, the guide inclined surface 521r of the first light guide plate guide member 521 may be disposed substantially in parallel to the corner inclined surface 100r that the first light guide plate guide member 521 is disposed adjacent to.

The inclined surface 521r of the first light guide plate guide member 521 prevents the movement of the light guide plate 100 in the lengthwise and widthwise directions of the light guide plate 100. For example, the inclined surface 521r of the first light guide plate guide member 521 may be disposed to intersect the light guide plate 100 in the lengthwise and widthwise directions of the light guide plate 100. Accordingly, the first light guide plate guide member 521 prevents the movement of the light guide plate 100 in both the lengthwise and widthwise directions of the light guide plate 100.

The first light guide plate guide member 521 may further include an optical sheet receiving portion 521G.

The optical sheet receiving portion 521G may be recessed inwardly from the guide inclined surface 521r. The optical sheet receiving portion 521G may provide a space in which to receive a corner of each of the optical sheets 300.

In exemplary embodiments, the optical sheet receiving portion 521G is disposed substantially on the same plane as the top surface 100a of the light guide plate 100, or is disposed above the top surface 100a of the light guide plate 100. If the optical sheet receiving portion 521G is disposed below the top surface 100a of the light guide plate 100, there may be difficulty in supporting the optical sheets 300, which are disposed on the top surface 100a of the light guide plate 100, with the optical sheet receiving portion 521G. Alternatively, disposing the optical sheet receiving portion 521G substantially on the same plane as the top surface 100a of the light guide plate 100, or above the top surface 100a of the light guide plate 100, as is the case according to exemplary embodiments of the present inventive concept, results in the optical sheet receiving portion 521G adequately supporting the optical sheets 300. Referring to FIG. 7, in an exemplary embodiment, the optical sheet receiving portion 521G is disposed above the top surface 100a of the light guide plate 100, in which case, a predetermined gap is formed between the light guide plate 100 and the optical sheets 300. When the optical sheet receiving portion 521G is disposed on the same plane as the top surface of the light guide plate 100, the optical sheets 300 may be placed in contact with the top surface 100a of the light guide plate 100.

Referring to FIG. 6, in an exemplary embodiment, similar to the first light guide plate guide member 521, the third light guide plate guide member 523 includes coupling portions 523C, which are fixed to the body portion 510 of the housing 500, and a guide inclined surface 523r, which prevents the movement of the light guide plate 100. Since the third light guide plate guide member 523 is disposed adjacent to the light source unit 200, the shape of the third light guide plate guide member 523 may differ from the shape of the first light guide plate guide member 521.

For example, the coupling portions 523C of the third light guide plate guide member 523 differ from the coupling portions 521C of the first light guide plate 521 in that they protrude inwardly beyond the third and fourth sidewalls 510S3 and 510S4. For example, one of the coupling portions 523C of the third light guide plate guide member 523 may be formed in consideration of the thickness of the light source unit 200, which is disposed near the third sidewall 510S3, to protrude inwardly beyond the third sidewall 510S3. The light source unit 200 may emit heat in the process of generating light, and due to the generated heat, the light guide plate 100 may deteriorate. Thus, the light guide plate 100 may be spaced apart from the light source unit 200, thereby preventing damage to the light guide plate 100.

In an exemplary embodiment, the shape of the inclined surface 523r of the third light guide plate guide member 523 corresponds to the shape of a corner inclined surface 100r of the light guide plate 100 corresponding to the third light guide plate guide member 523, and is disposed to intersect the light guide plate 100 in the lengthwise and widthwise directions of the light guide plate 100. Accordingly, the third light guide plate guide member 523, like the first light guide plate guide member 521, prevents the movement of the light guide plate 100 in both the lengthwise and widthwise directions of the light guide plate 100.

The inclined surfaces 521r through 524r of the first through fourth light guide plate guide members 521 through 524 prevents the movement of the light guide plate 100 in both the lengthwise and widthwise directions of the light guide plate 100, and as a result, the light guide plate 100 is stably fixed inside the housing 500.

Also, since the first through fourth light guide plate guide members 521 through 524 are disposed in the gaps provided at the corners 500r of the housing 500, the light guide plate 100 is stably fixed without increasing the bezel area of the display device 1.

Backlight units according to exemplary embodiments of the present inventive concept will hereinafter be described, with the description primarily focusing on differences between the backlight units described hereinafter and the backlight unit 20 according to the exemplary embodiment of FIG. 2. For convenience of explanation, a further description of elements and features that have already been described above may be omitted. FIGS. 8 through 13 illustrate the shapes of backlight units based on the mode of use of a display device. It is to be understood that if the mode of use of the display device changes, the shapes of the backlight units according to the exemplary embodiments of FIGS. 8 through 13 may also change in various manners.

Figure 8:
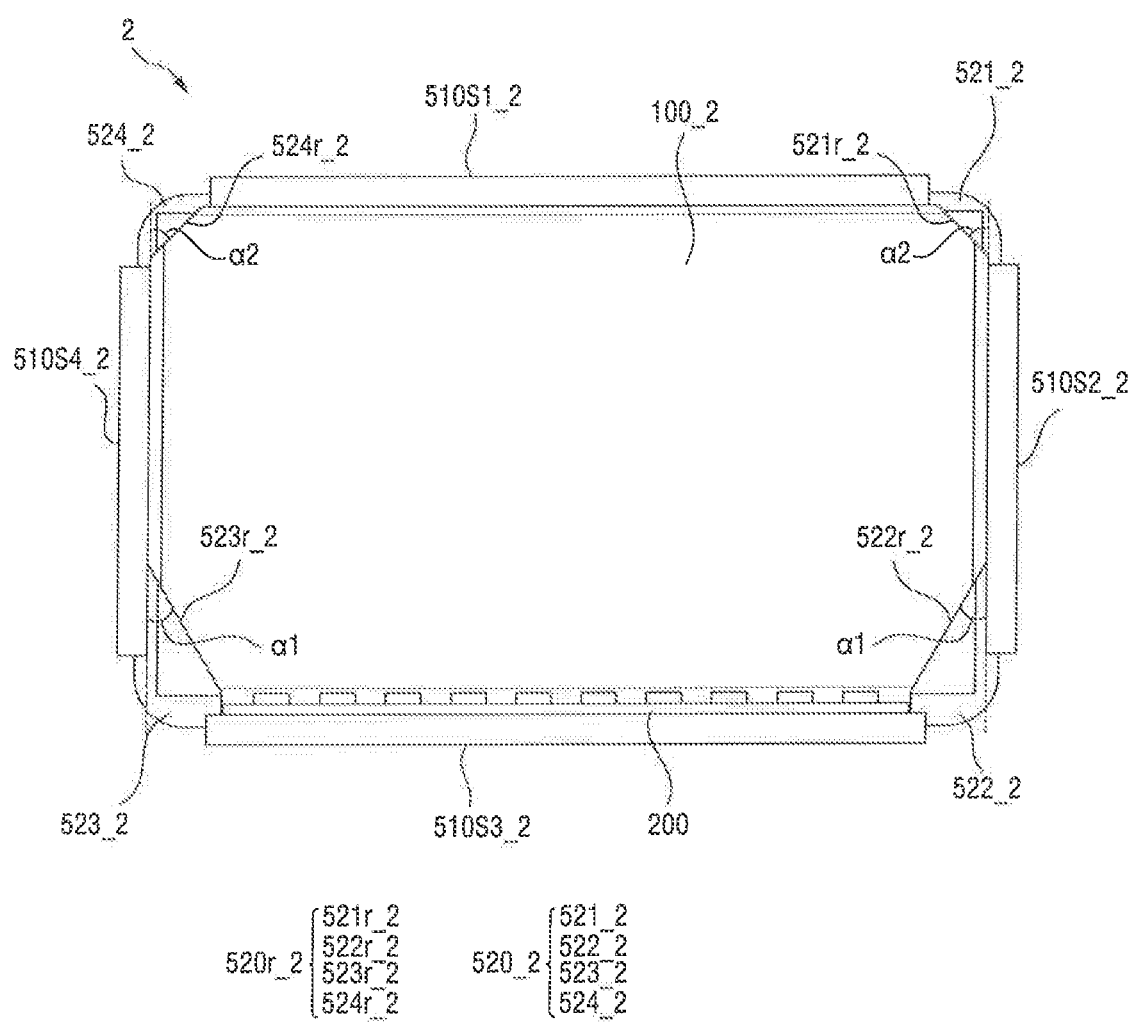
FIGS. 8 and 9 are plan views of backlight units according to exemplary embodiments of the present inventive concept.
Figure 9:
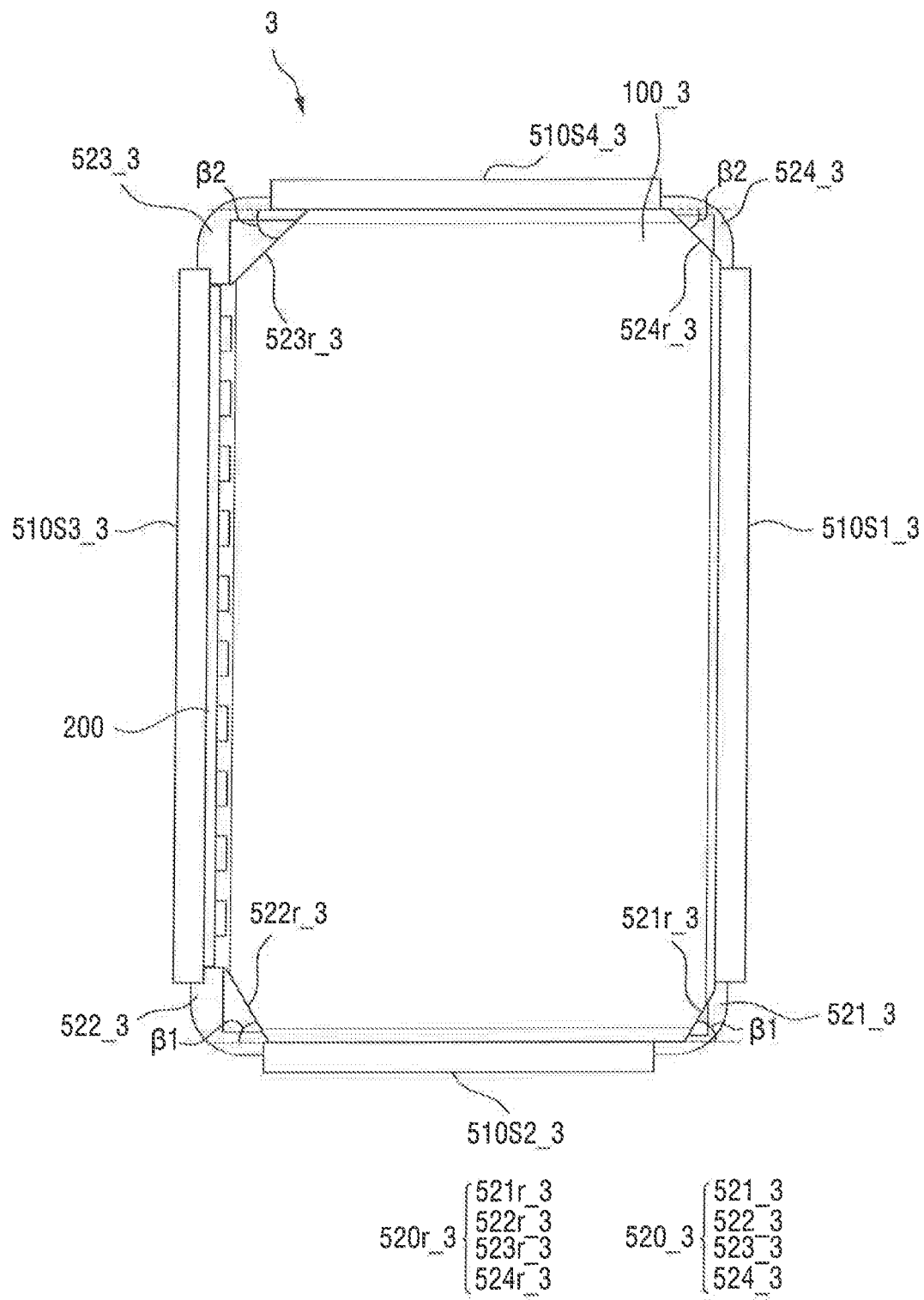

FIGS. 8 and 9 are plan views of backlight units according to exemplary embodiments of the present inventive concept.

FIG. 8 shows that the inclination angle of inclined surfaces 520r_2 of light guide plate is guide members 520_2 of a display device 2 may change. For example, the inclination angle of the inclined surfaces 520r_2 of the light guide plate guide members 520_2 may change depending on the mode of use of the display device 2.

Inclined surfaces 520r_2 of light guide plate guide members 520_2 that receive a relatively large load from the light guide plate 100 may have a larger inclination angle than inclined surfaces 520r_2 of light guide plate guide members 520_2 that receive a relatively small load from the light guide plate 100.

For example, if a light source unit 200 of the display device 2 is disposed at a lower part of the display device 2 (e.g., with respect to the direction in which gravity acts), the load of the light guide plate 100 may be applied more considerably to second and third light guide plate guide members 522_2 and 523_2 than to first and fourth light guide plate guide members 521_2 and 524_2. In this case, a first inclination angle $\alpha 1$ of an inclined surface 522r_2 of the second light guide plate guide member 522_2 with respect to a second sidewall 510S2_2 is smaller than a second inclination angle $\alpha 2$ of an inclined surface 521r_2 of the first light guide plate guide member 521_2 with respect to the second sidewall 510S2_2. Also, the inclination angle of an inclined surface 523r_2 of the third light guide plate guide member 523_2 with respect to a fourth sidewall 510S4_2 (e.g., the first inclination angle $\alpha 1$) is smaller than the inclination angle of an inclined surface 524r_2 of the fourth light guide plate guide member 524_2 with respect to the fourth sidewall 510S4_2 (e.g., the second inclination angle $\alpha 2$).

For example, the second inclination angle $\alpha 2$ may be about 45°, and the first inclination angle $\alpha 1$ may be about 30°. When the load of the light guide plate 100 is m and gravitational acceleration is a, the load of the light guide plate 100 applied to the inclined surfaces 520r_2 of the light guide plate guide members 520_2 is about 0.36*ma when the inclined surfaces 520r_2 of the light guide plate guide members 520_2 have an inclination angle of about 45°, and may be reduced to about 0.25*ma when the inclined surfaces 520$r$_2 of the light guide plate guide is members 520_2 have an inclination angle of about 30°. For example, the steeper the slope of the inclined surfaces 520$r$_2, the less the load applied to the inclined surfaces 520$r$_2 becomes. Thus, the inclination angle of the inclined surfaces 522$r$_2 and 523$r$_2 of the second and third light guide plate guide members 522_2 and 523_2 (e.g., the first inclination angle $\alpha$1) is smaller than the inclination angle of the inclined surfaces 521$r$_2 and 524$r$_2 of the first and fourth light guide plate guide members 521_2 and 524_2 (e.g., the second inclination angle $\alpha$2).

In FIG. 8, a light guide plate 100_2 corresponds to the light guide plate 100 previously described, and first and third sidewalls 510S1_2 and 510S3_2 correspond to the first and third sidewalls 510S1 and 510S3 previously described.

FIG. 9 shows that the inclination angle of inclined surfaces 520$r$_3 of light guide plate guide members 520_3 of a display device 3 may change.

The display device 3 of FIG. 9 differs from the display device 2 of FIG. 8 in that the display device 3 is positioned on its short side, whereas the display device 2 is positioned on its long side.

Referring to FIG. 9, in an exemplary embodiment, the slope of inclined surfaces 521$r$_3 and 522$r$_3 of first and second light guide plate guide members 521_3 and 522_3 is greater than the slope of inclined surfaces 523$r$_3 and 524$r$_3 of third and fourth light guide plate guide members 523_3 and 524_3. For example, a first inclination angle $\beta$1 of the inclined surfaces 521$r$_3 and 522$r$_3 of the first and second light guide plate guide members 521_3 and 522_3 with respect to a second sidewall 510S2_3 is smaller than a second inclination angle $\beta$2 of the inclined surfaces 523$r$_3 and 524$r$_3 of the third and fourth light guide plate guide members 523_3 and 524_3 with respect to a fourth sidewall 510S2_3, which is substantially parallel to the second sidewall 510S2_3. As described above, the steeper the slope of the inclined surfaces of light guide plate guide members, the less the load applied to the inclined surfaces of the light guide plate guide members becomes. Thus, the inclined surfaces 521$r$_3 and 522$r$_3 of the first and second light guide plate guide members 521_3 and 522_3, to which a relatively small load is applied, have a steeper slope than the inclined surfaces 523$r$_3 and 524$r$_3 of the third and fourth light guide plate guide members 523_3 and 524_3.

In FIG. 9, a light guide plate 100_3 corresponds to the light guide plate 100 previously described, and first and third sidewalls 510S1_3 and 510S3_3 correspond to the first and third sidewalls 510S1 and 510S3 previously described.

Figure 10:
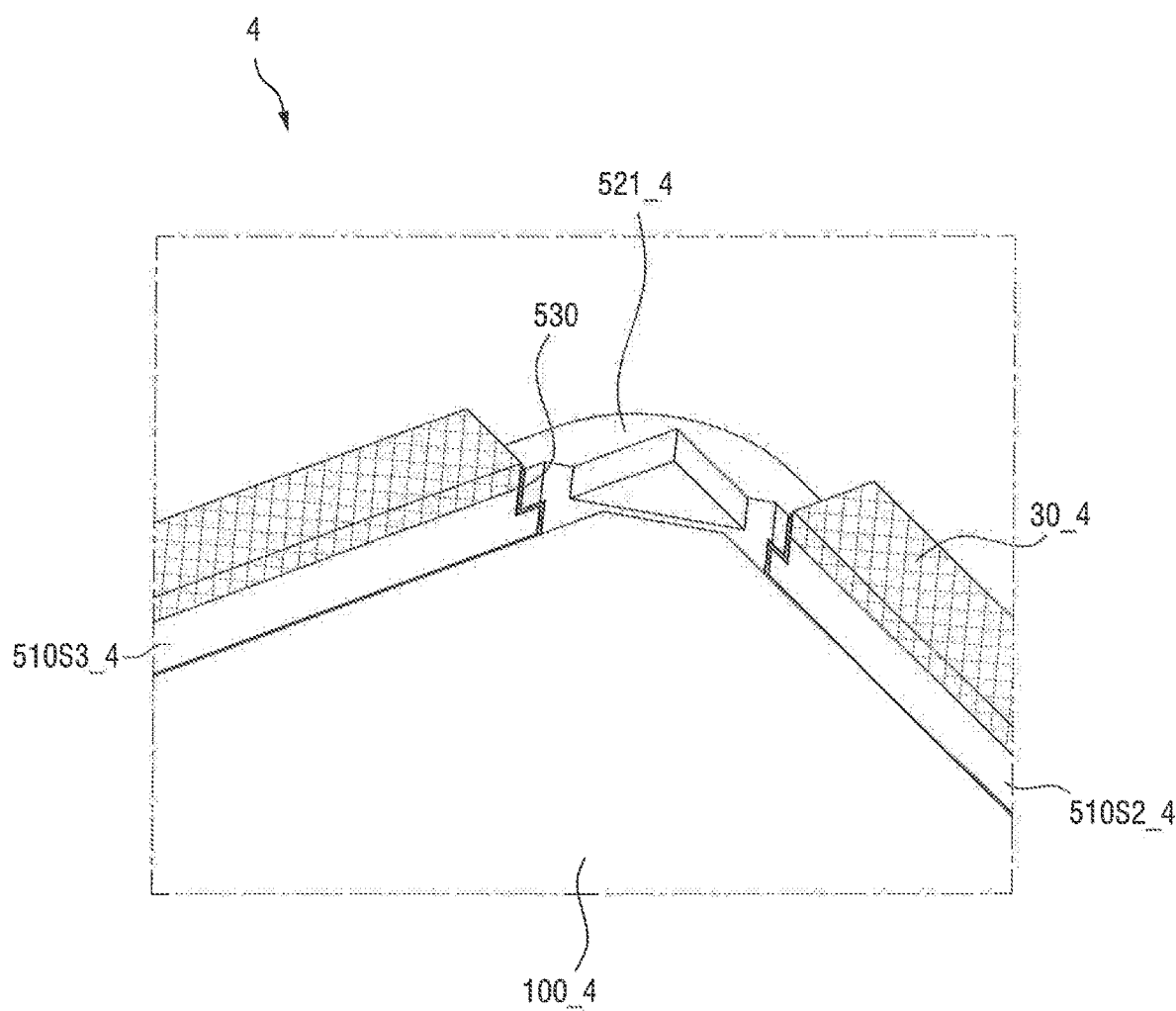
FIG. 10 is a partial perspective view of a backlight unit according to an exemplary embodiment of the present inventive concept.

FIG. 10 is a partial perspective view of a backlight unit according to an exemplary embodiment of the present inventive concept.

FIG. 10 shows that in an exemplary embodiment, coupling members 530 of light guide plate guide members 520 of a display device 4 are coupled to the body portion 510 of the housing 500.

Unlike the light guide plate guide members 520 of FIG. 1, the light guide plate guide members 520 of FIG. 10 may be formed first and may be coupled later to the housing 500.

The material of the light guide plate guide members 520 is not limited to a mold material, and the light guide plate guide members 520 may include various materials. For example, the light guide plate guide members 520 may include a material with elasticity such as silicone or rubber. In this case, the light guide plate guide members 520 may absorb impact that may be caused by the movement of a light guide plate 100_4. Thus, the light guide plate 100_4 is further stably fixed, and the durability of the display device 4 is improved.

In FIG. 10, a first light guide plate guide member 521_4 corresponds to the first light guide plate guide member 521 previously described, a house coupling member 30_4 corresponds to the house coupling member 30 previously described, a second sidewall 510S2_4 corresponds to the second sidewall 510S2 previously described, and a third sidewall 510S3_4 corresponds to the third sidewall 510S3 previously described.

Figure 11:
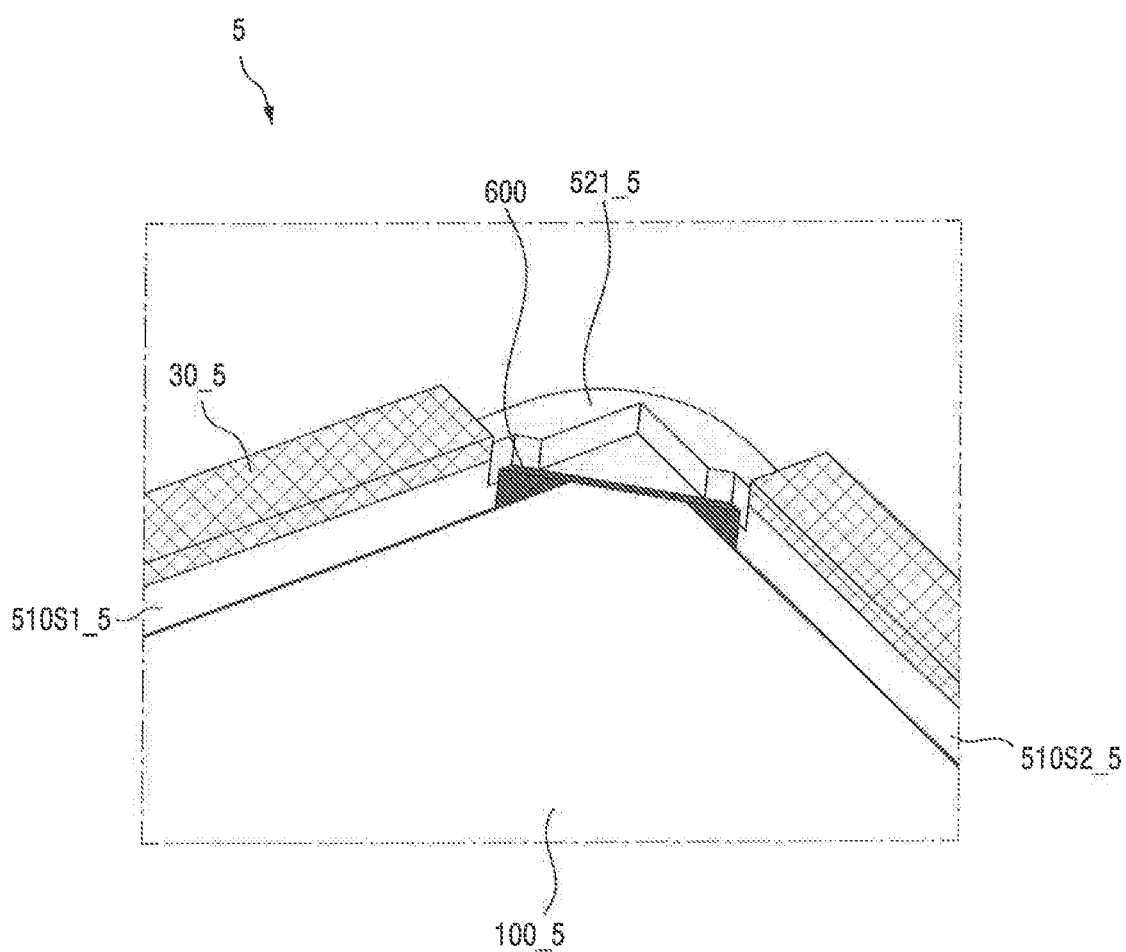
FIG. 11 is a partial perspective view of a backlight unit according to an exemplary embodiment of the present inventive concept.

FIG. 11 is a partial perspective view of a backlight unit according to an exemplary embodiment of the present inventive concept.

FIG. 11 shows that in an exemplary embodiment, an adhesive member 600 is disposed between the light guide plate guide members 520 of a light guide plate 100_5 of a display device 5.

The adhesive member 600 may include a material that can absorb impact. For example, the adhesive member 600 may be a polymer resin or an adhesive tape. In exemplary embodiments, the adhesive member 600 may include a light-absorbing material such as a black pigment or dye, or a reflective material, and may thus perform a light-blocking function that prevents light from leaking to unintended places, as described above.

The adhesive member 600 reduces or minimizes the movement of the light guide plate 100_5 and absorbs impact, and thus, further stably fixes the light guide plate 100_5. Accordingly, the durability of the display device 5 is improved.

In FIG. 11, the light guide plate 100_5 corresponds to the light guide plate 100 previously described, a house coupling member 30_5 corresponds to the house coupling member 30 previously described, a first sidewall 510S1_5 corresponds to the first sidewall 510S1 previously described, a second sidewall 510S2_5 corresponds to the second sidewall 510S2 previously described, and a first light guide plate guide member 521_5 corresponds to the first light guide plate guide member 521 previously described.

Figure 12:
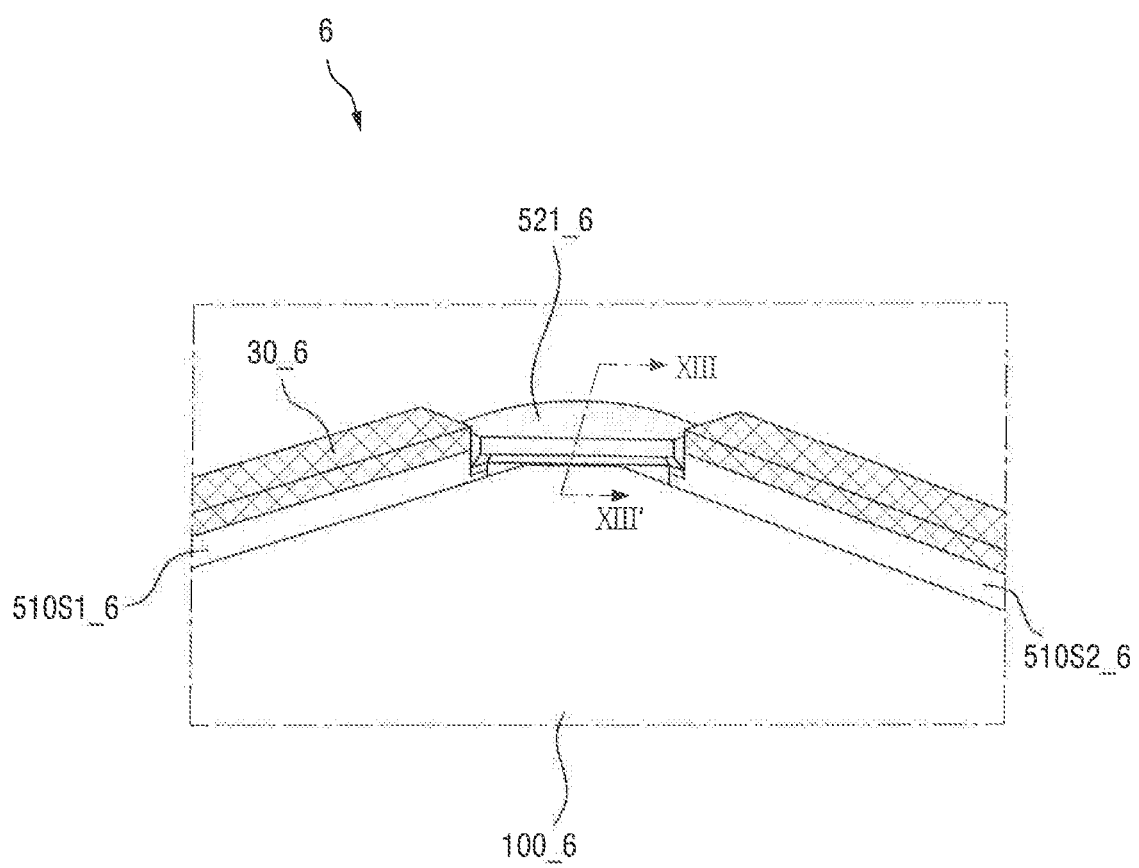
FIG. 12 is a partial perspective view of a backlight unit according to an exemplary embodiment of the present inventive concept.
Figure 13:
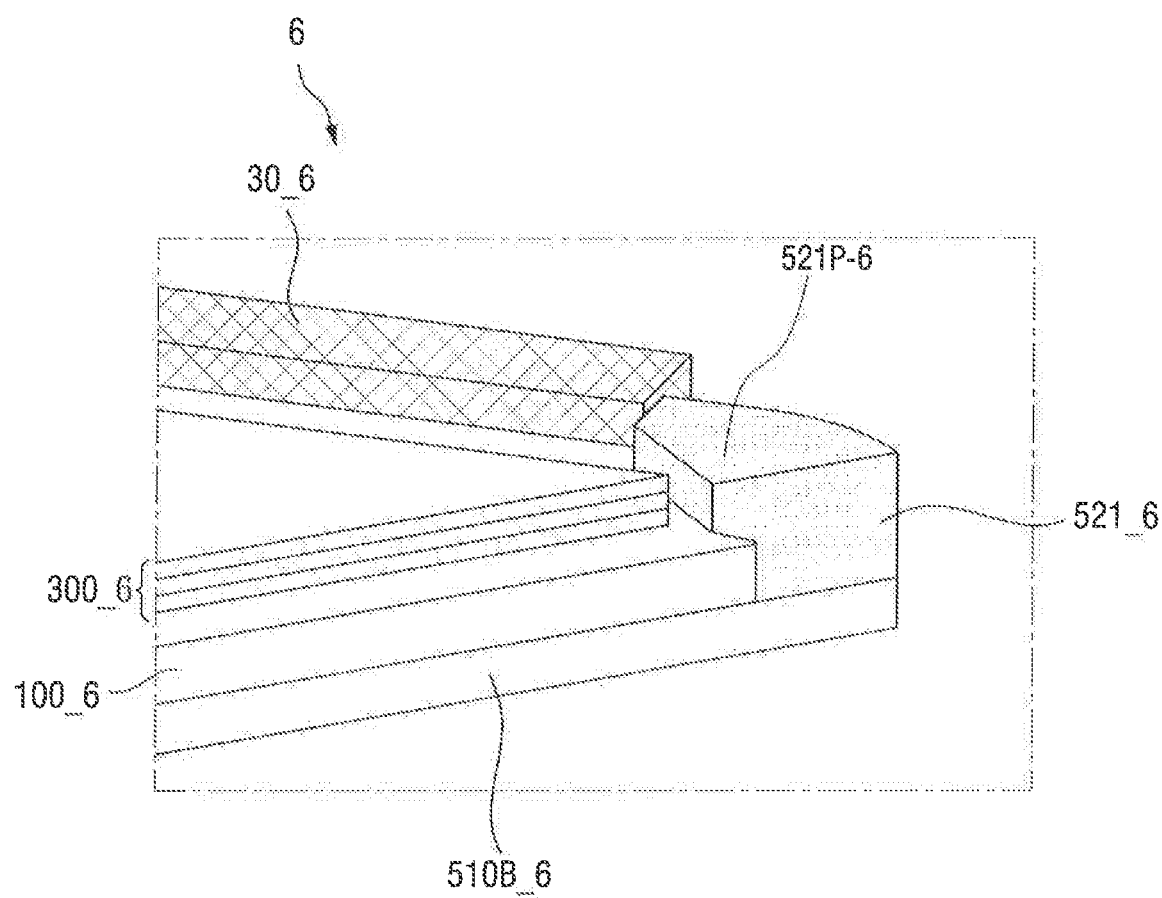
FIG. 13 is a cross-sectional view taken along line XIII-XIII' of FIG. 12 according to an exemplary embodiment of the present inventive concept.

FIG. 12 is a partial perspective view of a backlight unit according to an exemplary embodiment of the present inventive concept. FIG. 13 is a cross-sectional view taken along line XIII-XIII' of FIG. 12 according to an exemplary embodiment of the present inventive concept.

Referring to FIGS. 12 and 13, in an exemplary embodiment, the light guide plate guide member 520 of a display device 6 includes a protruding portion 521P_6.

In an exemplary embodiment, the protruding portion 521P_6 is disposed on the inner sides of the side surfaces 100$s$ of a light guide plate 100_6. For example, in an exemplary embodiment, the protruding portion 521P_6 partially covers the top surface 100$a$ of the light guide plate 100_6. The protruding portion 521P_6 prevents the movement of the light guide plate 100_6 in the height direction of the light guide plate 100_6.

The light guide plate guide member 520, which includes the protruding portion 521P_6, prevents the movement of the light guide plate 100_6 not only in the lengthwise and widthwise directions of the light guide plate 100_6, but also in the height direction of the light guide plate 100_6, and thus, further stably fixes the light guide plate 100_6.

In FIGS. 12 and 13, a light guide plate 100_6 corresponds to the light guide plate 100 previously described, a house coupling member 30_6 corresponds to the house coupling member 30 previously described, a first sidewall 510S1_6 corresponds to the first sidewall 510S1 previously described, a second sidewall 510S2_6 corresponds to the second sidewall 510S2 previously described, optical sheets 300_6 correspond to the optical sheets 300 previously described, a light guide plate guide member 521_6 corresponds to the light guide plate guide member 521 previously described, and a bottom surface 510B_6 corresponds to the bottom surface 510 previously described.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A backlight unit, comprising:
   a light guide plate (LGP);
   a housing that receives the LGP; and
   a first LGP guide member coupled to the housing, wherein
   the housing comprises a bottom surface, a first sidewall, and a second sidewall, wherein the first and second sidewalls are connected to edges of the bottom surface,
   the first and second sidewalls are disposed adjacent to each other and are spaced apart from each other, wherein a first corner of the bottom surface is disposed between the first and second sidewalls,
   the first LGP guide member is disposed in a gap between the first and second sidewalls,
   the LGP comprises a corner inclined surface disposed at a corner of the LGP, and
   the first LGP guide member comprises a guide inclined surface, wherein the guide inclined surface of the first LGP guide member is disposed opposite to the corner inclined surface of the LGP.

2. The backlight unit of claim 1, further comprising:
   an adhesive member disposed between the guide inclined surface of the first LGP guide member and the corner inclined surface of the LGP.

3. The backlight unit of claim 1, wherein the first LGP guide member is a mold guide.

4. The backlight unit of claim 1, wherein the first LGP guide member comprises a material with elasticity.

5. The backlight unit of claim 4, wherein the first LGP guide member comprises silicone or rubber.

6. The backlight unit of claim 4, further comprising:
   an adhesive member disposed between the first LGP guide member and the housing.

7. The backlight unit of claim 1, wherein the first LGP guide member comprises an optical sheet receiving portion, wherein the optical sheet receiving portion is recessed inwardly from the guide inclined surface of the first LGP guide member.

8. The backlight unit of claim 1, wherein the first LGP guide member comprises a protruding portion, wherein the protruding portion protrudes from the guide inclined surface of the first LGP guide member toward the LGP.

9. The backlight unit of claim 1, wherein
   the housing further comprises a third sidewall,
   the third sidewall is disposed opposite to the first sidewall, the third sidewall is spaced apart from the second sidewall, and a second corner of the bottom surface is disposed between the second and third sidewalls, and
   the backlight unit further comprises a second LGP guide member, wherein the second LGP guide member is disposed in a gap between the second and third sidewalls.

10. The backlight unit of claim 9, wherein the second LGP guide member comprises a guide inclined surface, wherein the guide inclined surface of the second LGP guide member is disposed opposite to another corner inclined surface of the LGP.

11. The backlight unit of claim 10, wherein an inclination angle of the guide inclined surface of the first LGP guide member with respect to the second sidewall is greater than an inclination angle of the guide inclined surface of the second LGP guide member with respect to the second sidewall.

12. A display device, comprising:
   a backlight unit, comprising:
   a light guide plate (LGP);
   a housing that receives the LGP; and
   a first LGP guide member coupled to the housing,
   wherein the housing comprises a bottom surface, a first sidewall, and a second sidewall,
   wherein the first and second sidewalls are connected to edges of the bottom surface, the first and second sidewalls are disposed adjacent to each other and are spaced apart from each other, and a first corner of the bottom surface is disposed between the first and second sidewalls,
   wherein the first LGP guide member is disposed in a gap between the first and second sidewalls,
   wherein the LGP comprises a corner inclined surface disposed at a corner of the LGP, and
   wherein the first LGP guide member comprises a guide inclined surface, wherein the guide inclined surface of the first LGP guide member is disposed opposite to the corner inclined surface of the LGP; and
   a display panel disposed on the backlight unit.

13. The display device of claim 12, further comprising:
   a housing coupling member disposed between the housing and the display panel, wherein the housing coupling member fixes the display panel to the housing.

14. The display device of claim 13, wherein the housing comprises a protruding portion that protrudes outwardly from the first sidewall, and the housing coupling member is disposed on the protruding portion.

15. The display device of claim 14, wherein the housing coupling member comprises a light-absorbing material or a reflective material.

16. The display device of claim 12, wherein
   the housing further comprises a third sidewall,
   the third sidewall is disposed opposite to the first sidewall, the third sidewall is spaced apart from the second sidewall, and a second corner of the bottom surface is disposed between the second and third sidewalls, and
   the backlight unit further comprises a second LGP guide member, wherein the second LGP guide member is disposed in a gap between the second and third sidewalls.

17. The display device of claim 16, wherein the second LGP guide member comprises a guide inclined surface, wherein the guide inclined surface of the second LGP guide member is disposed opposite to the another corner inclined surface of the LGP disposed at another corner of the LGP.

18. The display device of claim 17, wherein an inclination angle of the guide inclined surface of the first LGP guide member with respect to the second sidewall is greater than an inclination angle of the guide inclined surface of the second LGP guide member with respect to the second sidewall.

* * * * *